(12) United States Patent
Chatenet et al.

(10) Patent No.: US 9,540,093 B2
(45) Date of Patent: Jan. 10, 2017

(54) BLADED ROTOR WHEEL FOR A TURBINE ENGINE

(75) Inventors: Luc Henri Chatenet, Siene Port (FR); John Le Quellec, Vaux le Penil (FR)

(73) Assignee: SNECMA, Paris (FR)

( * ) Notice: Subject to any disclaimer, the term of this patent is extended or adjusted under 35 U.S.C. 154(b) by 451 days.

(21) Appl. No.: 14/236,254

(22) PCT Filed: Aug. 2, 2012

(86) PCT No.: PCT/FR2012/051830
§ 371 (c)(1),
(2), (4) Date: Jan. 30, 2014

(87) PCT Pub. No.: WO2013/017805
PCT Pub. Date: Feb. 7, 2013

(65) Prior Publication Data
US 2014/0161617 A1    Jun. 12, 2014

(30) Foreign Application Priority Data

Aug. 3, 2011    (FR) ...................................... 11 57123

(51) Int. Cl.
*B64C 11/04*    (2006.01)
*F01D 5/32*    (2006.01)
(Continued)

(52) U.S. Cl.
CPC ............. *B64C 11/04* (2013.01); *F01D 5/3092* (2013.01); *F01D 5/323* (2013.01); *F04D 29/322* (2013.01);
(Continued)

(58) Field of Classification Search
CPC ..... B23P 15/006; F04D 29/023; F04D 29/322; Y10T 29/49332; F05D 2300/505; F05D 2260/30; Y10S 416/50; B64C 11/04
See application file for complete search history.

(56) References Cited

U.S. PATENT DOCUMENTS 5,820,347 A    10/1998    Bussonnet et al.
6,481,971 B1    11/2002    Forrester
(Continued)

FOREIGN PATENT DOCUMENTS

CH    DE 3236021 A1 *    5/1983    ............. C22F 1/006
DE    32 36 021    5/1983
(Continued)

OTHER PUBLICATIONS

English Translation of DE 3236021. Google Patents. Ret Jun. 20, 2016.*
(Continued)

*Primary Examiner* — Jacob Cigna
(74) *Attorney, Agent, or Firm* — Oblon, McClelland, Maier & Neustadt, L.L.P.

(57) ABSTRACT

A bladed rotor wheel for a turbine engine, the rotor wheel including a disk including, formed in its outer periphery, at least one slot for mounting the roots of blades, and a spacer mounted between each blade root and a bottom of the slot. The spacer includes at least one member of type that is bistable in position and that can occupy a first stable position for assembly or disassembly in which the member does not exert force on the blade root, and a second stable position in which the bistable member exerts a radial force on the blade root. The spacer also includes at least one resilient damper member mounted between the bottom of the slot and the blade root.

11 Claims, 3 Drawing Sheets

(51) Int. Cl.
*F04D 29/32* (2006.01)
*F04D 29/66* (2006.01)
*F01D 5/30* (2006.01)

(52) U.S. Cl.
CPC ......... *F04D 29/668* (2013.01); *F05D 2260/30* (2013.01); *Y02T 50/672* (2013.01); *Y10T 29/49332* (2015.01)

(56) References Cited

U.S. PATENT DOCUMENTS

| | | | |
|---|---|---|---|
| 7,108,484 B2 * | 9/2006 | Thenaisie | F01D 5/323 416/221 |
| 2001/0028848 A1 * | 10/2001 | Tempere | F01D 5/3007 416/221 |
| 2006/0165530 A1 | 7/2006 | Corbin et al. | |
| 2010/0189564 A1 | 7/2010 | Stone | |
| 2012/0210579 A1 | 8/2012 | Stone | |
| 2013/0156591 A1 * | 6/2013 | Alexander | F01D 5/3092 416/221 |
| 2014/0178202 A1 * | 6/2014 | Chatenet | F01D 5/303 416/221 |

FOREIGN PATENT DOCUMENTS

| | | |
|---|---|---|
| EP | 1 209 322 | 5/2002 |
| EP | 1 693 551 | 8/2006 |
| FR | 2 746 456 | 9/1997 |
| JP | 61 129405 | 6/1986 |
| JP | 64 069702 | 3/1989 |
| JP | 1 237304 | 9/1989 |
| JP | 2007 120460 | 5/2007 |

OTHER PUBLICATIONS

U.S. Appl. No. 14/118,436, filed Feb. 11, 2014, Chatenet, et al.
International Search Report issued Oct. 10, 2012 in PCT/FR2012/051830 filed Aug. 2, 2012.
French Search Report issued Feb. 23, 2012 in FR 1157123 filed Aug. 3, 2011.

* cited by examiner

BLADED ROTOR WHEEL FOR A TURBINE ENGINE

BACKGROUND OF THE INVENTION

Field of the Invention

The present invention relates to a bladed rotor wheel for a turbine engine, and more particularly to a fan wheel of a turbine engine such as an airplane turboprop or turbojet.

Description of the Related Art

Conventionally, a fan wheel comprises a disk carrying blades at its outer periphery, the blades having roots that are engaged in substantially axial slots formed in the outer periphery of the disk. The fan blades are held radially on the disk by co-operation between the shape of their roots and the shape of the slots in the disk, the blade roots being of the dovetail type, for example. Inter-blade platforms are mounted on the disk between the fan blades or they constitute an integral portion of the disk. Blades of this type are described by way of example in document FR 2 881 174 in the name of the Applicant. The slots may be straight or curvilinear and the contact surfaces between the blade roots and the inside walls of the slots are referred to as "bearing" surfaces.

The blades are mounted with clearance between their roots and the walls of the slots. In order to reduce this clearance, proposals have been made to mount resilient spacers between the bottoms of the slots and the blade roots, so that the blade roots are held pressed radially against the bearing surfaces of the disk.

The spacers need to be of high precision in order to ensure that the blades are held without being completely blocked in a position that would prevent the blade roots form bearing normally against the bearing surfaces of the slots.

That type of rotor wheel presents the drawbacks set out below.

The rotation of the rotor wheel while the engine is in operation causes large centrifugal forces to be applied to the blades, thereby holding them in their "operating" positions. By way of example, a fan blade weighing about 4.5 kilograms (kg) may be subjected to a force that is greater than 60 (metric) tonnes (t).

For a fan wheel in particular, after the blades have been assembled on the wheel, any unbalance that appears during rotation of the wheel is measured. If this unbalance is greater than a determined threshold, certain blades are disassembled and interchanged in order to reduce the unbalance.

In the absence of a spacer, or when the spacers are insufficiently prestressed, every time the rotor wheel is stopped, it occupies an angular position that is different, and the blades can change position under the effect of their own weight. Under such circumstances, since the positions of the blades, and thus the unbalance of the rotor wheel, are different from one start to another, it is difficult to measure and reduce any unbalance.

In addition, the small-amplitude movements of the blades under high loading that take place each time the engine is started cause the inside surfaces of the assembly slots for the blade roots to be worn. This is known as "fretting" wear, and it can prevent the integrity of the disk and of the blades being inspected by means of eddy currents, which in turn can lead to a disk and/or blades being scrapped, even if they are in fact still usable.

Furthermore, when fan blades are made of composite material, it is not possible to mount the spacers while subjecting the blade roots to high stress, since the roots cannot withstand such stresses.

Patent application FR 11/54301 in the name of the Applicant and not yet published, describes a bladed rotor wheel for a turbine engine, the rotor wheel comprising a disk and spacers mounted between the blade roots and the bottoms of the slots in the disk. The spacers are of the type that is bistable in position and each of them can occupy a first stable position for assembly or disassembly in which they do not exert force on the blade roots, and a second stable position in which they exert a radial force on the blade roots in order to hold the blades stationary and stabilize them in a final position.

In that way, it is possible, while these spacers are in a first position, to assemble them together with the blades in the slots of the disk, and then to rotate the disk at a speed that is sufficient for the spacers and the blades to take up their final positions, with each spacer becoming deformed so as to pass from its first position to its second position, the blades subsequently being held in their final positions by the spacers, even when the disk is rotating slowly or stopped.

For rotor wheels of a low pressure or a high pressure compressor of a turbine engine, first rotation of the wheel is performed at a speed lying in the range 2500 revolutions per minute (rpm) to 4000 rpm, so as to cause the spacers to deform. Simultaneously, the tips of the blades are trued at high speed. Thereafter, the rotor wheel is balanced at low speed without disassembling the blades.

The use of shape memory spacers is also known from document DE 3 236 021.

For blades of large size, such as fan blades in particular, the solution proposed in document FR 11/54301 presents the drawbacks set out below.

The fan wheel is surrounded by a fan casing having its inside surface provided with an abradable material, the radially outer ends of the blades coming flush with the inside surface of the casing.

Given the size of the blades, the radially outer ends of the blades can move considerably on first rotation of the wheel. Those ends then degrade the abradable material of the casing significantly.

For fan wheels in particular, it is not envisaged that the wheel might be set into rotation without its casing.

Furthermore, in the event of a bird or an article of significant size being ingested, the fan blades are subjected to violent impacts that cause them to tilt. These impacts must be damped and the tilting of the blades must be limited.

Unfortunately, under certain circumstances, the prior art bistable spacer is found to be incapable of damping the impact energy or of limiting the movement of the blade.

Finally, it is possible to use bladed disks made as single blocks, in which the blades and the disks are made in a single block by machining.

Nevertheless, that solution is not applicable to all rotors, in particular because of thermal stresses, of mechanical stresses, and of weight constraints, and costs are very high both for manufacture and for maintenance.

Brief Summary of the Invention

A particular object of the invention is to provide a solution to the above-specified problems that is simple, effective, and inexpensive.

To this end, the invention provides a bladed rotor wheel for a turbine engine, the rotor wheel comprising a disk in which the outer periphery is formed with slots for assembling blade roots, a spacer being assembled between each blade root and the bottom of the slot, the rotor wheel being characterized in that the spacer includes at least one member of the type that is bistable in position and that can occupy a first stable position for assembly or disassembly in which it does not exert force on the blade root, and a second stable position in which it exerts a radial force on the blade root for holding the blade stationary and stabilizing it in a final position, the spacer also including at least one resilient damper member mounted between the bottom of the slot and the blade root, the blade root being designed to bear against said resilient damper member, at least prior to the bistable member occupying its second position.

After the spacer has been put into place, the resilient damper member is compressed between the bottom of the slot and the blade root so as to hold the root prior to first rotation of the wheel. Once first rotation has been performed, the bistable member is in its second position and is effective at holding the blade in position.

Because of the presence of the resilient damper member, any movement of the blade is greatly limited during this first rotation, thereby avoiding degradation of the abradable material of the casing.

In the event of an impact against a blade, caused by ingesting a bird or a solid body, the bistable member is not necessarily capable of absorbing all of the energy of the impact and of limiting the movement of the blade, but this function can be performed by the resilient damper member.

According to another characteristics of the invention, the spacer comprises a support of elongate shape, presenting at least a first zone in which the resilient damper member is mounted and a second zone in which a bistable spring in the form of a resilient strip is mounted, the spring being deformable between the two above-mentioned positions.

In particular, the support, in its second zone, presents a generally U-shaped section having a base facing towards the bottom of the slot with two branches projecting therefrom, the spring being fastened via its ends to said branches.

The spring therefore does not bear against the walls of the slot, but against the support. This avoids any premature degradation of the disk.

Preferably, the spring includes a flyweight.

The flyweight may be dimensioned so as to adjust accurately the speed of rotation beyond which the transition takes place from the first stable position to the second stable position.

The branches of the support may include grooves or notches in order to limit their stiffness.

In addition, the bistable member may be made of a shape memory material that is deformable by mechanical, thermal, or electrical stress.

The spacer may then be deformed from one stable position to another stable position by applying appropriate stress.

According to another characteristic of the invention, the bistable member includes means for co-operating with a tool for causing it to pass from the second stable position to the first stable position, the support including at least one access opening for passing the tool.

The spacer can then be disassembled quickly and easily by an operator, in particular when performing maintenance or in the event of it being necessary to interchange certain blades in order to reduce unbalance.

The resilient damper member may be in the form of at least one pad of resilient material, e.g. of elastomer.

Furthermore, the shape and the mass of the bistable member are determined so that it is caused to pass from the first stable position to the second stable position by centrifuging, e.g. by rotating the wheel at a speed greater than 2000 rpm.

The invention also provides a method of assembling and balancing a rotor wheel of the above-specified type, the method being characterized in that it comprises the steps consisting in:
assembling the blades and the spacers in an assembly position in the slot(s) of the disk;
rotating the wheel at a speed that is sufficient to cause the blades to move by centrifuging into a normal operating position, and to cause each bistable member to pass into its second stable position so as to stabilize the blades in their operating positions; and
reducing the unbalance of the wheel, e.g. by disassembling and interchanging certain blades.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
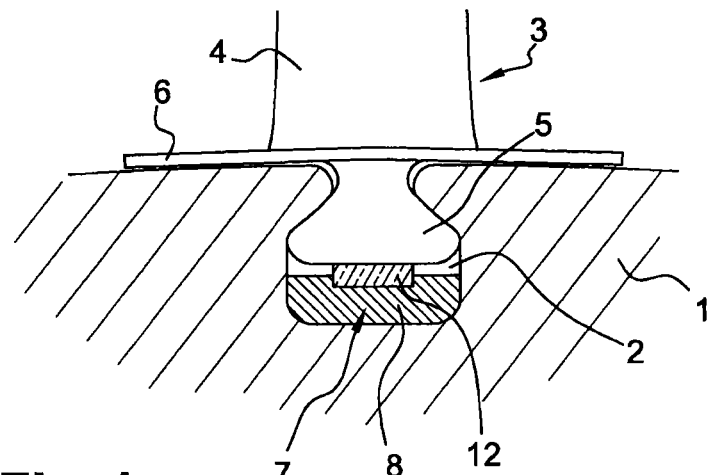
FIG. 1 is a fragmentary section view of a rotor wheel of the invention.

FIG. 1 shows a portion of a bladed rotor wheel of a turbine engine, e.g. a fan wheel, comprising a disk 1 with a plurality of substantially axial slots 2 formed in its outer periphery.

Each blade 3 comprises an airfoil 4 and a dove-tailed root 5 that is engaged in the slot 2 of the disk 1, the slot being of a shape that is complementary to the shape of the blade root in order to hold the blade 3 radially on the disk 1. The blade 3 also has platforms 6 that are contiguous in order to define an inside surface of a fluid flow passage, and that are situated radially between the blade root 5 and the airfoils 4.

A spacer 7 is mounted between each blade root and the bottom of the corresponding slot. As can be seen better in FIG. 2, the spacer 7 comprises a support 8 of elongate shape extending substantially along the axis A of the disk 1 and of the slot 2. In the embodiment shown, the spacer 7 has five general zones, namely two end zones 9, a central zone 10, and two intermediate zones 11 that are situated between the central zone 10 and respective ones of the end zones 9.

Resilient damper members are mounted on the support in the end zones 9 and in the central zone 10. The damper zones are pads 12 of elastomer material, e.g. of ethylene propylene diene monomer (EPDM) or of silicone.

Figure 3:
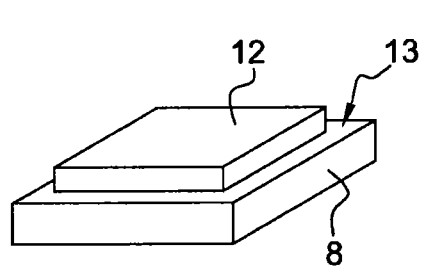
FIG. 3 is a perspective view of a portion of the spacer including a resilient damper member, in one embodiment of the invention.

FIG. 3 is a diagram showing the central zone 10 of a spacer 7 in a first embodiment of the invention in which a single pad 12 of generally rectangular block shape is mounted on the outer surface 13 of the support, facing towards the blade root.

Figure 4:
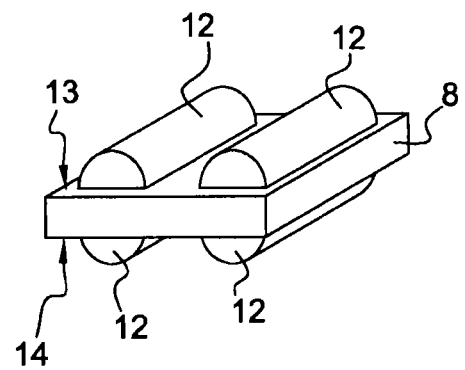
FIG. 4 is a view corresponding to FIG. 3 in a variant embodiment of the invention.

FIG. 4 shows another embodiment in which the inner face 14 (facing towards the bottom of the slot 2) and the outer face 13 (facing towards the blade root 5) are each fitted with two respective pads 12 of semicylindrical shape, and oriented along the axis A of the spacer 7.

Naturally, other configurations may be envisaged, the embodiments shown merely being examples of possible embodiments.

The intermediate zones 11 are fitted with members that are bistable in position.

More particularly, in each of the intermediate zones 11, the support 8 presents a section that is generally U-shaped, having a base 15 beside the bottom of the slot 2 and from which there project two branches 16, a spring 17 in the form of a resilient strip being fastened via its ends 18 to the branches 16.

The spring 17 is of the type that is bistable in position and it may occupy a first stable position for assembly or disassembly in which it does not exert a force on the blade root 5, and a second stable position in which it exerts a radial force on the blade root 5 in order to hold the blade stationary and stabilize it in a final position, as disclosed in document FR 11/54301.

A flyweight 19 is fastened in a central zone of the spring 17, e.g. by means of a screw or by crimping.

The shapes and the masses of the spring 17 and of the flyweight 19 are determined in such a manner that the transition from the first stable position to the second stable position takes place automatically by centrifuging when the rotor is rotating at a speed greater than 2000 rpm.

The spring 17 may be made of a metal material presenting mechanical characteristics that are appropriate and compatible with the temperatures reached in the zones in question. The spring 17 may also be made of a shape memory material that is deformable by mechanical, thermal, or electrical stress.

Figure 2:
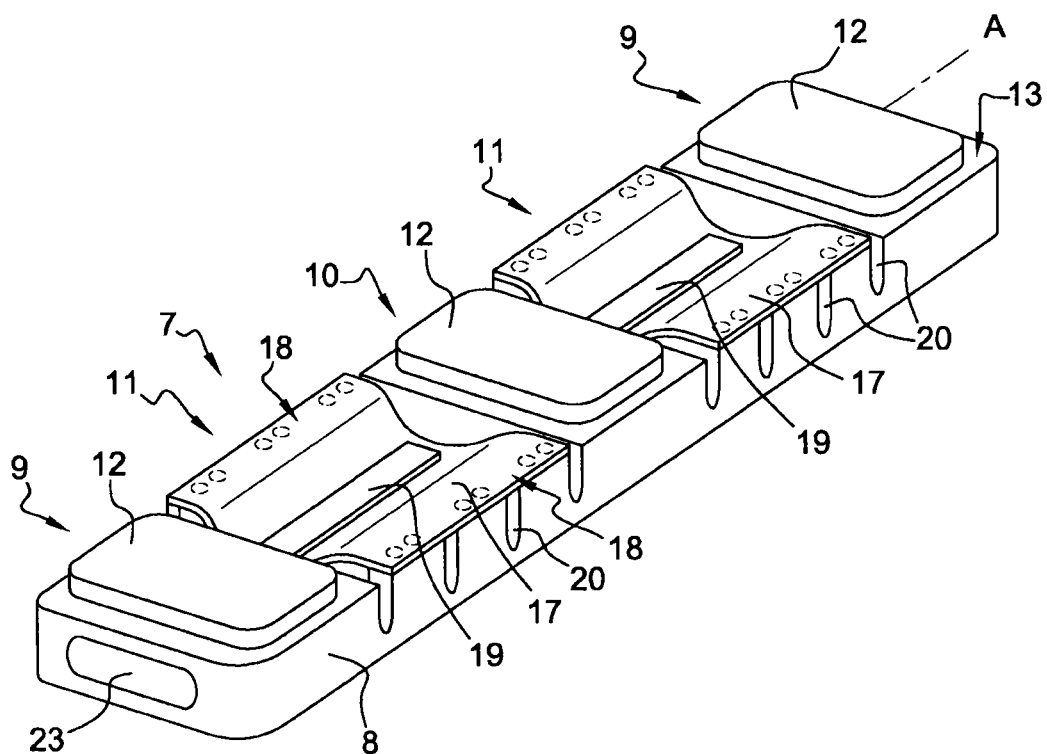
FIG. 2 is a perspective view of a spacer fitted to the rotor wheel of the invention.

In the embodiment of FIG. 2, the branches 16 of the support 8 include notches 20, e.g. extending perpendicularly to the axis A, in order to adjust the stiffness of the branches 16 of the support 8 as a function of requirements.

Figure 5:
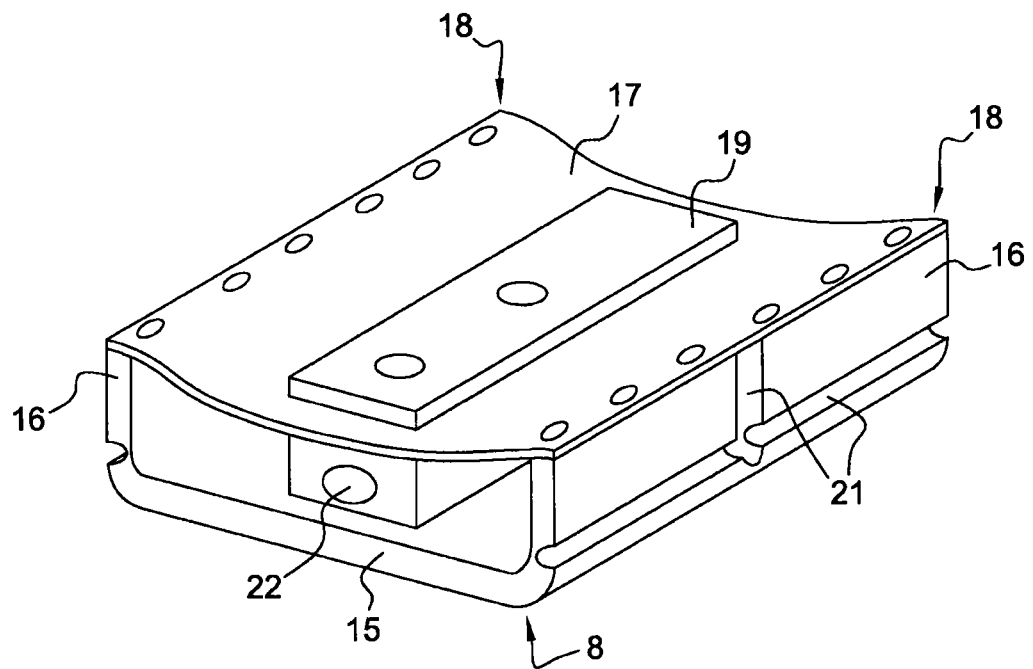
FIG. 5 is a perspective view of a portion of the spacer including a member of bistable position, in an embodiment of the invention.
Figure 6:
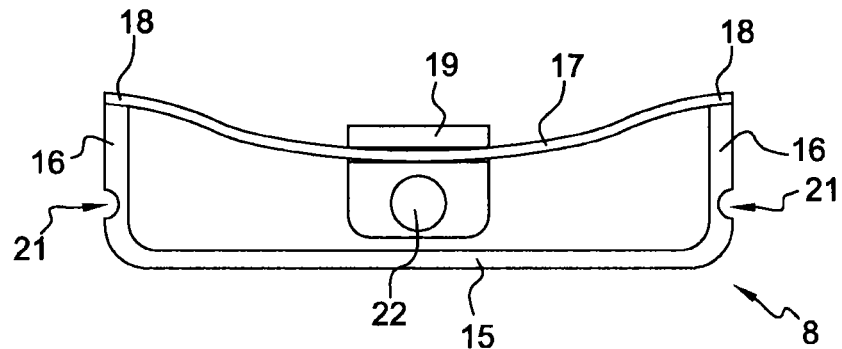
FIG. 6 is a cross-section view of the spacer portion shown in FIG. 5.

In another embodiment shown in FIGS. 5 and 6, the branches 16 include recesses or grooves 21 likewise for adjusting the stiffness of said branches 16. By way of example, the grooves 21 may be oriented parallel to the axis A or perpendicularly thereto.

By way of example, the spring 17 may be fastened to the two branches 16 (FIGS. 2, 5, 6) by welding, or by any other fastening means.

Figure 7:
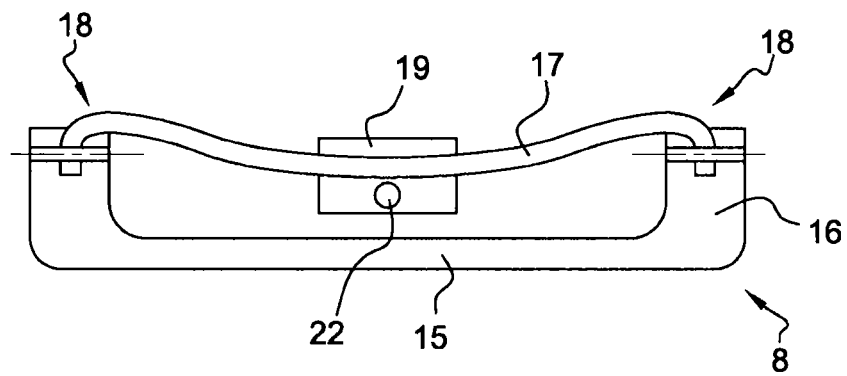
FIG. 7 is a view corresponding to FIG. 6, showing a variant embodiment of the invention.

By way of example, FIG. 7 shows a variant embodiment in which the ends 18 of the spring 17 are curved towards the base 15 and are fastened by being embedded in the branches 16. This situation may be preferred in particular when the materials of the springs 17 and of the branches 16 are not suitable for performing a welding operation.

The flyweights 19 have through holes 22 oriented along the axis of the spacer. The ends 9 of the support 8 also include access openings 23 (FIG. 2) allowing a tool to pass so that the end of the tool can be inserted through the access openings 23 into the holes 22 in the flyweights 19 for the purpose of moving the springs 17 from its position for holding the blade 3 towards its disassembly position.

In a variant, the slots 2 may be curvilinear. Under such circumstances, the spacers 7 are no longer generally rectilinear in shape, but present a shape that is generally curvilinear, matching the shape of the slots 2.

Furthermore, the number of zones 9, 10, and 11, and thus the number of bistable members and the number of damper members, and also their relative arrangements, may be varied as a function of constraints concerning the weights and the mechanical stresses involved.

A method of assembling and balancing a rotor wheel of the invention is described in detail below.

Firstly, the blades 3 are mounted together with the spacers 7 in the slots 2 of the disk 1. The springs 17 are then in their first stable positions, i.e. in their assembly and disassembly positions, and they do not exert any force on the blade roots 5. The pads 12 are compressed under the force exerted by the blade roots 5, with the pads 12 being flattened by about 0.1 millimeters (mm) to 0.3 mm, for example.

Thereafter, the rotor is rotated at a speed that is sufficient to bring the blades 3 by centrifuging into a final operating position and to cause each of the springs 17 to pass into its second stable position. By way of example, this speed of rotation is about 2000 rpm to 3000 rpm.

During this rotation, each spring 17 deforms from its first stable position towards its second stable position in which the middle zone of each of the springs 17 is pressed against the corresponding blade root 5.

Also during this rotation, the pads 12 serve to some extent to hold the blades 3 in position before they are held by the springs 17. The ability of each blade 3 to move is thus greatly limited during this first rotation of the rotor, thereby avoiding damage to the abradable material of the outer casing.

In their second stable positions, the springs 17 apply a radially outwardly-directed force against the blade roots 5 that is sufficient to hold the blades 3 in their operating position when the rotor is idling or stopped. This force is determined so as to be capable of compensating the weight of the blade 3 and also the inertial effects that occur on starting the turbine engine.

It is then possible to slow down or stop the rotation of the rotor, with the blades 3 being held and stabilized by the springs 17 in their operating positions.

If necessary, it is then possible to reduce any unbalance of the rotor, e.g. by disassembling and interchanging some of the blades 3. For this purpose, the operator can move the springs 17 towards their disassembly positions with the help of a tool, as mentioned above. The spacers 7 can then be withdrawn and reassembled freely.

During a stage of operation, in the event of an impact against one or more blades 3, as a result of a bird or a solid body being ingested, the pads 12 are capable of damping the movement of the blades in question sufficiently and also of absorbing sufficient energy to avoid the blades being damaged.

The invention claimed is:

1. A bladed rotor wheel for a turbine engine, the rotor wheel comprising:
   a disk including, formed in an outer periphery thereof, a slot for assembling a root of a blade; and
   a spacer mounted between the blade root and a bottom of the slot, the spacer including
      a member of type that is bistable in position and that can occupy a first stable position for assembly or disassembly in which the bistable member does not exert force on the blade root, and a second stable position which the bistable member exerts a radial force on the blade root for holding the blade stationary and stabilizing the blade in a final position, a resilient damper member mounted between the bottom of the slot and the blade root, the blade root configured to bear against the resilient damper member, at least prior to the bistable member occupying the second stable position, and a support of elongate shape, including a first zone in which the resilient damper member is mounted and a second zone in which a bistable spring in a form of a resilient strip is mounted, the spring being deformable between the first and second stable positions, wherein, in the second zone, the support includes a base and two branches projecting from the base, and the spring is fastened to ends of the branches.

2. A rotor wheel according to claim 1, wherein the bistable member is made of a shape memory material that is deformable by mechanical, thermal, or electrical stress.

3. A rotor wheel according to claim 1, wherein the support including at least one access opening for passing a tool for causing the bistable member to pass from the second stable position to the first stable position.

4. A rotor wheel according to claim 1, wherein the resilient damper member is in a form of at least one pad of resilient material, or of elastomer.

5. A rotor wheel according to claim 1, wherein shape and mass of the bistable member are determined so that the bistable member is caused to pass from the first stable position to the second stable position by centrifuging.

6. A rotor wheel according to claim 5, wherein the shape and the mass of the bistable member are determined so that the bistable member is caused to pass from the first stable position to the second stable position by rotating a wheel at a speed greater than 2000 rpm.

7. A rotor wheel according to claim 1, wherein, in the second zone, the support presents a generally U-shaped section in which the base is beside a bottom of the slot and the two branches project therefrom.

8. A rotor wheel according to claim 7, wherein the spring includes a flyweight.

9. A rotor wheel according to claim 7, wherein the branches of the support include grooves or notches.

10. A method of assembling and balancing a rotor wheel according to claim 1, the method comprising:

assembling the blade and the spacer in an assembly position in the slot of the disk;

rotating the rotor wheel at a speed that is sufficient to cause the blade to move by centrifuging into a normal operating position, and to cause the bistable member to pass into the second stable position to stabilize the blade in the operating positions; and reducing unbalance of the rotor wheel.

11. A method according to claim 10, wherein the reducing unbalance of the rotor wheel is performed by disassembling and interchanging the blade.

* * * * *